United States Patent
Smith (10) Patent No.: US 11,634,587 B2
(45) Date of Patent: Apr. 25, 2023

(54) WAX COATING OVER PHOSPHATE COATING FOR VEHICLE COMPONENTS

(71) Applicant: MAGNA INTERNATIONAL INC., Aurora (CA)

(72) Inventor: Kevin Dale Smith, Sterling Heights, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 836 days.

(21) Appl. No.: 16/496,515

(22) PCT Filed: Mar. 22, 2018

(86) PCT No.: PCT/US2018/023783
§ 371 (c)(1),
(2) Date: Sep. 23, 2019

(87) PCT Pub. No.: WO2018/175731
PCT Pub. Date: Sep. 27, 2018

(65) Prior Publication Data
US 2021/0079227 A1  Mar. 18, 2021

Related U.S. Application Data

(60) Provisional application No. 62/476,297, filed on Mar. 24, 2017.

(51) Int. Cl.
*C09D 1/00* (2006.01)
*B05D 7/14* (2006.01)
(Continued)

(52) U.S. Cl.
CPC ............... *C09D 1/00* (2013.01); *B05D 7/14* (2013.01); *C08K 3/04* (2013.01); *C08K 3/08* (2013.01);
(Continued)

(58) Field of Classification Search
CPC ........ B05D 7/14; B05D 2202/15; C08K 3/04; C08K 3/08; C08K 2203/0893; C09D 1/00;
(Continued)

(56) References Cited

U.S. PATENT DOCUMENTS 3,547,711 A    12/1970   Ashdown et al.
3,839,099 A    10/1974   Jones
(Continued)

FOREIGN PATENT DOCUMENTS

CN    101812682 A    8/2010
EP      2366743 A2   9/2011
JP    2001179873 A   3/2001

OTHER PUBLICATIONS

Second Chinese Office Action with English translation dated Aug. 26, 2021 for Chinese Application No. 201880018738.7, 20 pages.
(Continued)

*Primary Examiner* — James C Goloboy
(74) *Attorney, Agent, or Firm* — Dickinson Wright PLLC (57) ABSTRACT

A coating for vehicle components, such as frame assemblies and cradle assemblies formed of steel, is provided. The coating includes a first layer including a high phosphate composition applied to the substrate, and a second layer including wax applied to the first layer. For example, the first layer can include a first inorganic acid, an inorganic salt, a second inorganic acid, nickel salt, and ammonium bifluoride; and the second layer can include petroleum, carbon black pigment, and a corrosion inhibitor, the corrosion inhibitor including magnesium. The coating has been found to improve corrosion resistance when applied to steel substrates, compared to wax coatings which are currently applied to steel substrates.

20 Claims, 11 Drawing Sheets

(51) Int. Cl.
 C08K 3/04 (2006.01)
 C08K 3/08 (2006.01)
 C09D 5/08 (2006.01)
 C09D 191/06 (2006.01)
 C09D 7/40 (2018.01)
 C23C 2/00 (2006.01)
(52) U.S. Cl.
 CPC ............... *C09D 5/08* (2013.01); *C09D 7/40* (2018.01); *C09D 191/06* (2013.01); *C23C 2/00* (2013.01); *B05D 2202/15* (2013.01); *C08K 2003/0893* (2013.01)
(58) Field of Classification Search
 CPC .......... C09D 5/08; C09D 7/40; C09D 191/06; C23C 2/00
 See application file for complete search history.

(56) References Cited

U.S. PATENT DOCUMENTS

| | | |
|---|---|---|
| 5,081,174 A | 1/1992 | VanBuskirk |
| 5,294,251 A | 3/1994 | Urena |
| 5,797,987 A * | 8/1998 | Rossio .................. C23C 22/362 106/14.44 |
| 6,509,099 B1 * | 1/2003 | Urata .................... C23C 22/365 428/423.1 |
| 7,759,419 B2 * | 7/2010 | Staffer ..................... C09C 1/56 252/387 |
| 2004/0065389 A1 * | 4/2004 | Kolberg ................. C23C 22/73 427/376.1 |
| 2006/0113012 A1 * | 6/2006 | Okamoto ................ C22C 38/14 148/602 |
| 2010/0252241 A1 | 10/2010 | McDermott et al. |
| 2010/0316888 A1 | 12/2010 | Stalker et al. |

OTHER PUBLICATIONS

"Fundamentals of Electroplating Electrochemistry," edited by Guocai Guo, p. 136, East China University of Science and Technology Press, published Aug. 2016, 2 pages.

Huang Changzhi, "Car Decoration and Beauty", p. 102, Beihang University Press, published in Aug. 2011.

Zhou Changchun, "University Chemistry", p. 93, China University of Mining and Technology Press, published in Jun. 2016.

Liu Jingan, "Concise Handbook of Magnesium Alloy Materials", pp. 835-836, Metallurgical Industry Press, published in Aug. 2016.

Explanation of Relevance; Three Common Sense Evidence documents are cited in the first Office Action in Chinese application No. 201880018738.7 (national phase application of PCT/US2018/023783).

* cited by examiner

| Cyclic Data as Collected | | | | |
|---|---|---|---|---|
| Sample ID | Description | After 1 Pint of Gravel | Exposure A (6 Cycles / 0.85 Grams of Mass Loss) | UB Exposure D (63 Cycles / 8.88 Grams of Mass Loss) |
| D1 | Format 1280 HT @ 33% Conversion |  |  |  |
| E1 | Format 1280 HT @ 66% Conversion |  |  |  |
| F3 | Format 1280 HT @ 100% Conversion |  |  |  |

WAX COATING OVER PHOSPHATE COATING FOR VEHICLE COMPONENTS

CROSS REFERENCE TO RELATED APPLICATIONS

This U.S. National Stage Patent Application claims the benefit of PCT International Patent Application Serial No. PCT/US2018/023783 filed Mar. 22, 2018 entitled "Wax Coating Over Phosphate Coating For Vehicle Components" which claims the benefit of U.S. Provisional Patent Application Ser. No. 62/476,297 entitled "Wax Coating Over Phosphate Coating For Vehicle Components," filed Mar. 24, 2017, the entire disclosures of the applications being considered part of the disclosure of this application, and hereby incorporated by reference.

BACKGROUND OF THE INVENTION

1. Field of the Invention

The invention relates generally to a coating for vehicle components, methods of manufacturing the coating, vehicle components including the coating, such as steel frame and cradle assemblies, and methods of manufacturing the vehicle components.

2. Related Art

Vehicle components for vehicles, such as frame assemblies and cradle assemblies formed of steel, have been coated to reduce corrosion. Coatings formed of wax can be applied to the steel components. However, the steel components coated with wax typically show signs of corrosion after 68 cycles. Thus, improved corrosion resistance is desired.

SUMMARY

One aspect of the invention provides a coating for a vehicle component, such as a frame or cradle assembly formed of steel. When the coating is applied to a steel substrate, the coating has been found to improve corrosion resistance. The coating comprises a first layer including phosphate, and a second layer including wax applied to the first layer.

Another aspect of the invention provides a method of manufacturing a coating for a vehicle component. The method comprises the step of applying a second layer including wax to a first layer including phosphate.

Yet another aspect of the invention provides a vehicle component. The vehicle component comprises a substrate and a coating applied to the substrate, wherein the coating includes a first layer including phosphate applied to the substrate, and a second layer including wax applied to the first layer.

Another aspect of the invention provides a method of manufacturing a vehicle component. The method comprises the steps of applying a first layer including phosphate to a substrate, and applying a second layer including wax to the first layer.

DETAILED DESCRIPTION OF EXAMPLE EMBODIMENTS

Figure 1:
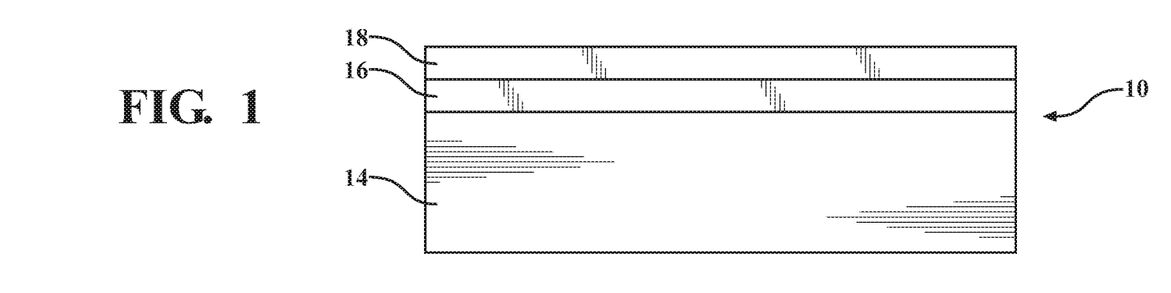
FIG. 1 is a cross-sectional view of a coating comprising a first layer including phosphate applied to a substrate and a second layer including wax applied to the first layer according to an example embodiment.
Figure 2:
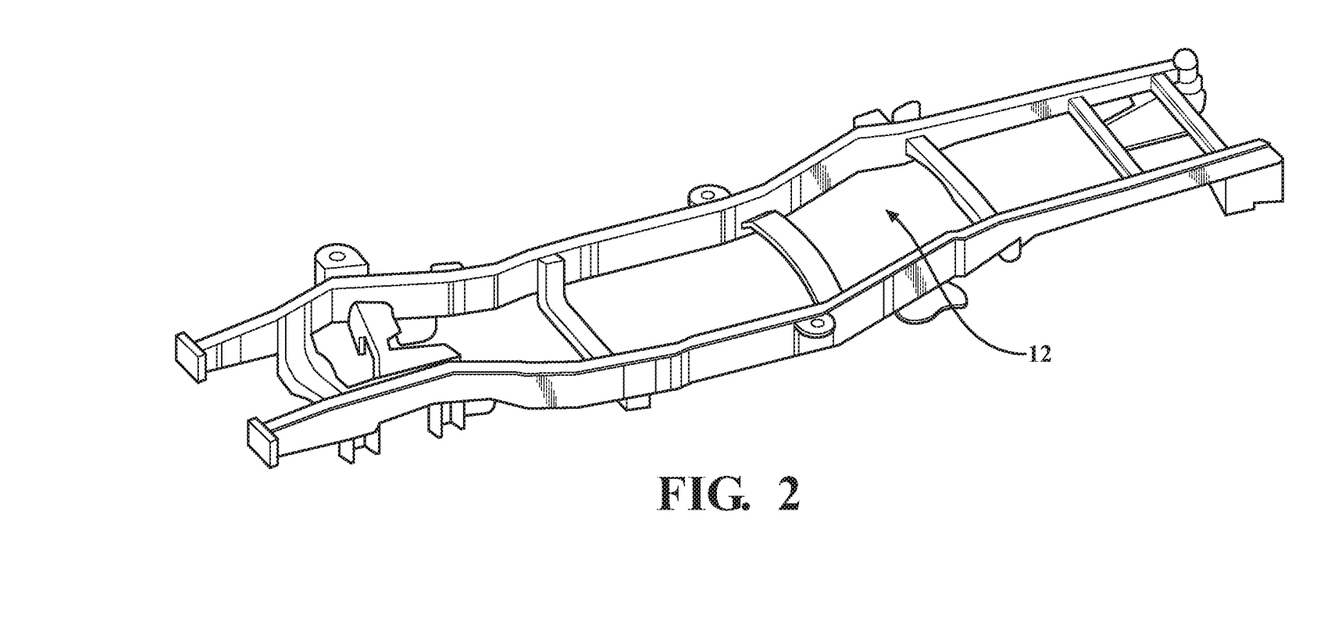
FIG. 2 illustrates a cradle assembly for an vehicle which can be coated with the coating of FIG. 1 according to an example embodiment.

The invention provides a coating 10 for vehicle components 12, such as frame assemblies and cradle assemblies formed of steel, and other types of vehicle components formed of steel. The coating 10 has been found to improve corrosion resistance when applied to steel substrates 14, compared to wax coatings which are currently applied to steel substrates. An example of the coating 10 is shown in FIG. 1. An example of the component 12, specifically a cradle assembly for a vehicle which can be coated, is shown in FIG. 2.

As shown in FIG. 1, the coating 10 includes a first layer 16 applied to the substrate 14, such as a substrate 14 formed of steel. The first layer 16 is typically applied directly to the substrate 14. According to example embodiments, the steel used to form the substrate 14, such as the substrate 14 of the frame and cradle assemblies, is HSLA (High Strength Low Alloy Steel) having a thickness ranging from 2.5 to 3.5 millimeters. The substrate 14 can have various different sizes and shapes, depending on the type of component 12 to be formed.

The first layer 16 of the coating 10 includes phosphate and can be referred to as a high phosphate composition. The first layer 16 can also include zinc. Table 1 includes the composition of the first layer 16 according to example embodiments. It is noted that the wt. % listed is relative to the total weight of the first layer 16. It is also noted that the inorganic acids and the inorganic salt include the phosphate, and at least one of the inorganic acids and the inorganic salt can include zinc.

TABLE 1

| Component | Amount |
| --- | --- |
| Inorganic Acid 2 | 30-40 wt. % |
| Inorganic Salt | 10-20 wt. % |
| Inorganic Acid 1 | 10-20 wt. % |
| Nickel Salt | 1-10 wt. % |
| Ammonium bifluoride | 0.1-1.0 wt. % |

The first layer 16 including phosphate can have a range of thicknesses depending on the particular application. However, according to an example embodiment, the first layer 16 has a thickness of 65 microns. The first layer 16 including the phosphate typically has a weight of 900 mg/ft$^2$ to 1500 mg/ft$^2$ or 1500 mg/ft$^2$ to 2400 mg/ft$^2$ to achieve long term corrosion performance.

The first layer 16 including phosphate can act as a stone chip barrier therefore allowing for minimal corrosion mitigation to occur. The first layer 16 is also preferably evenly distributed across the substrate 14 surface to ensure all exposed surface areas of the substrate 14 are fully covered. Covering all surface areas provides adequate corrosion protection on any welds, backside of welds, and heat affected zones that may be present along the substrate 14.

The coating also includes a second layer 18 which is typically applied directly to the first layer 16. The second layer 18 includes wax. According to one embodiment, the second layer 18 is formed from petroleum, carbon black pigment, and a corrosion inhibitor. The corrosion inhibitor preferably includes magnesium. Table 2 includes the composition of the second layer 18 according to example embodiments. It is noted that the wt. % provided is relative to the total weight of the second layer 18.

TABLE 2

| Component | Amount |
| --- | --- |
| Naphtha (Petroleum) hydro sulfurized heavy w/w % | 10-25 wt. % |
| Carbon black pigment | 5-10 wt. % |
| Proprietary corrosion inhibitor | 55-70 wt. % |

The second layer 18 including wax can have a range of thicknesses depending on the particular application. However, according to an example embodiment, the second layer 18 has a thickness of 75 to 125 microns. The magnesium added to the second layer 18 can act as a corrosion inhibitor. The second layer 18 is also preferably evenly distributed across the first layer 16 and the substrate 14 to ensure all exposed surface areas of the first layer 16 and the substrate 14 are fully covered. Covering all surface areas provides adequate corrosion protection on any welds, backside of welds, and heat affected zones that may be present along the substrate 14.

It has been found the coating 10 including the first and second layers 16, 18 described herein can provide a heavy phosphate coating on the steel substrate 14 that will delay the corrosion mitigation of the component 12 for an extended period of time meeting and or exceeding cyclitive corrosion performance achieved by comparative wax coatings applied to steel substrates. For example, a comparative example component including a wax coating with magnesium applied to a steel substrate has been found to achieve 68 cycles before showing signs of minimal corrosion. However, the component 12 described above, with the coating 10 including the first layer 16 and second layer 18 applied to the steel substrate 14, can achieve 95 +/−5 cycles before showing signs of corrosion when tested in a GM cyclic corrosion test chamber per test method GM14872 and using a gravelometer. The first layer 16 of the coating 10 tested had a weight of 1500 to 2400 mg/ft$^2$.

FIGS. 3-12 illustrate the results of tests conducted to evaluate the corrosion performance of the coatings 10 applied to steel substrates 14 according to example embodiments of the invention and comparative examples.

Figure 3:
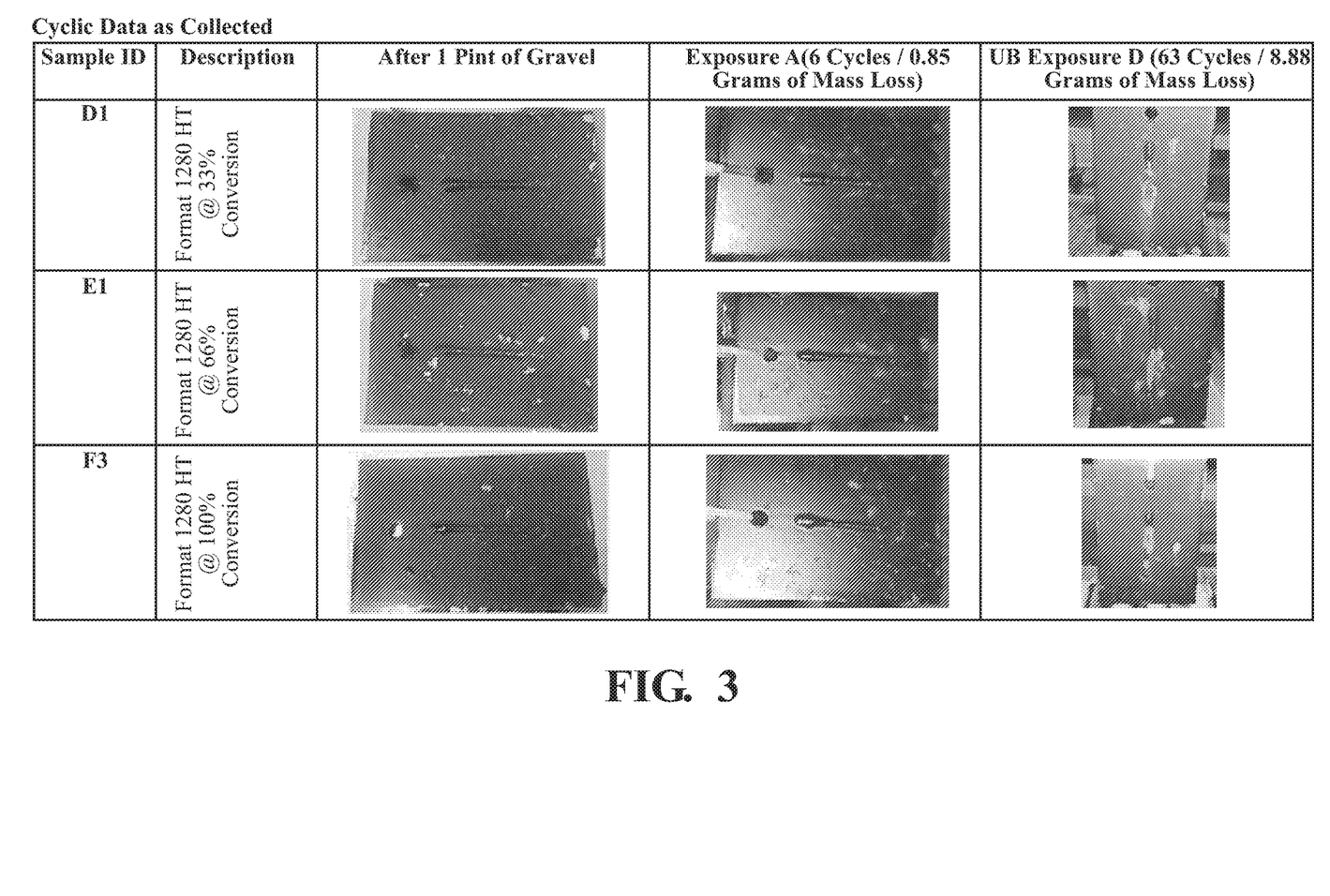
FIGS. 3-12 include results of tests performed to evaluate corrosion performance of coatings applied to steel substrates according to example embodiments.

FIG. 3 illustrates the corrosion performance of coated steel panels, wherein the coating applied to the steel panels is converted from a 1280HT first generation wax to 1290HP high performance wax.

Figure 4:
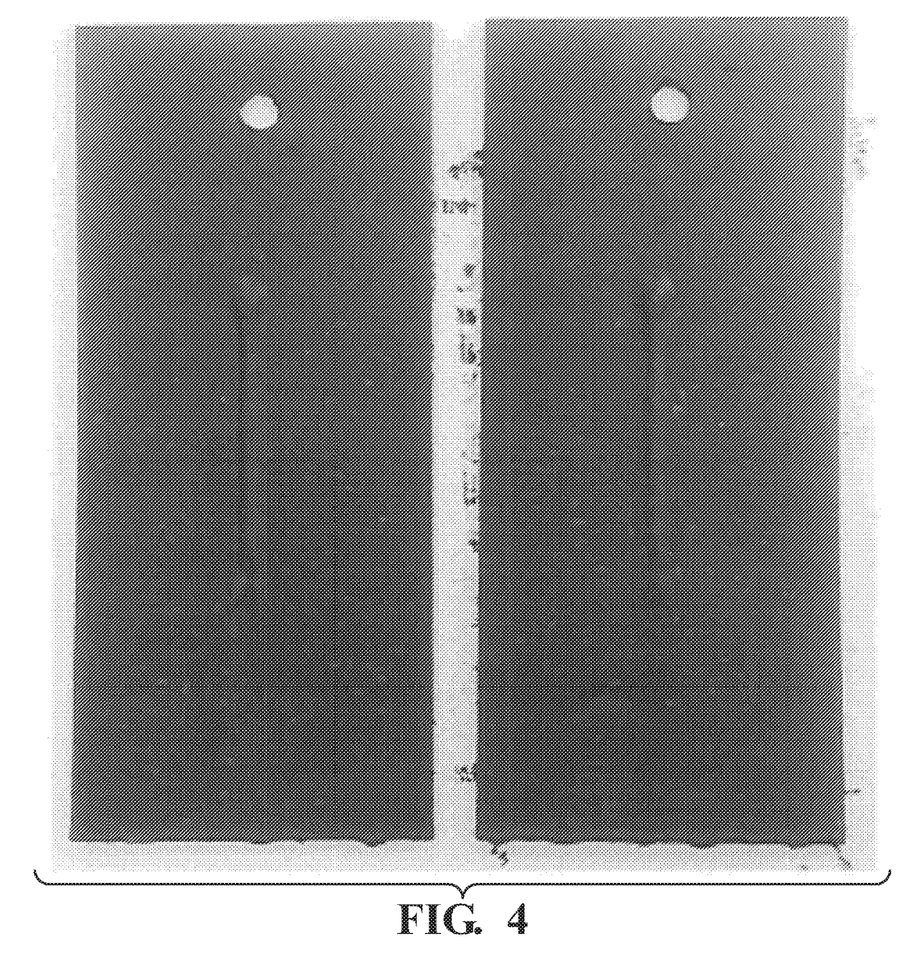
Figure 5:
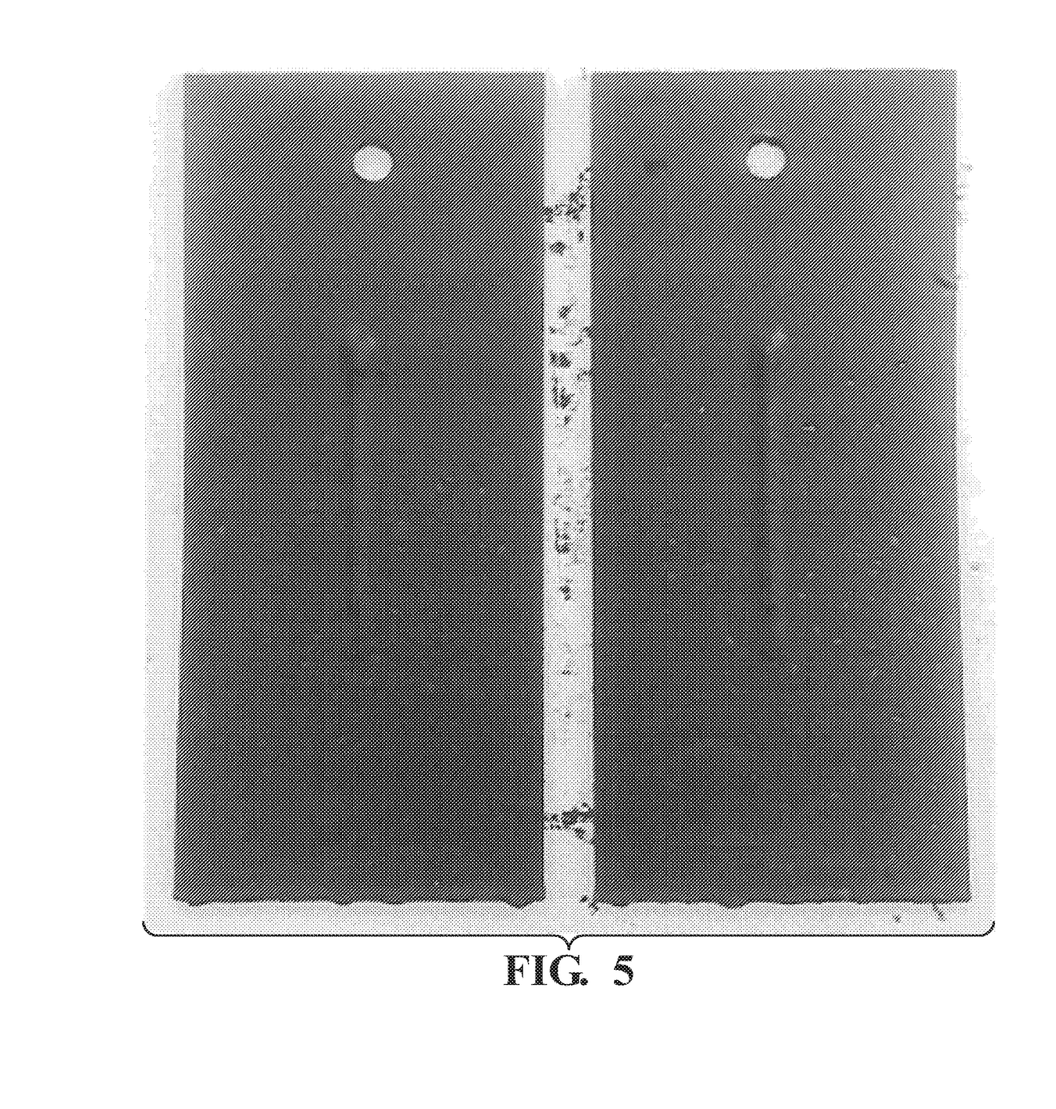

FIG. 4 shows post heat treated steel panels coated with the first layer 16 including phosphate (example referred to as "Enthone Phosphate") and the second layer 18 including a standard NOX resistant high performance wax (example referred to as "NR 1290 HP Standard"). FIG. 5 shows steel panels coated with the first layer 16 including phosphate (example referred to as "Enthone Phosphate") and the second layer 18 including 70% Mg NOX resistant high performance wax (example referred to as "NR 1290 HP at 70% Mg"). Enthone phosphate is also referred to as Endure ZNH4000, and HP is for first generation. The corrosion performance of the panels of FIGS. 4 and 5 was measured, and the panels had an average GMW 15357 rating of 10, on a rating scale per standard from 1 to 10, with 10 being the best.

Figure 6:
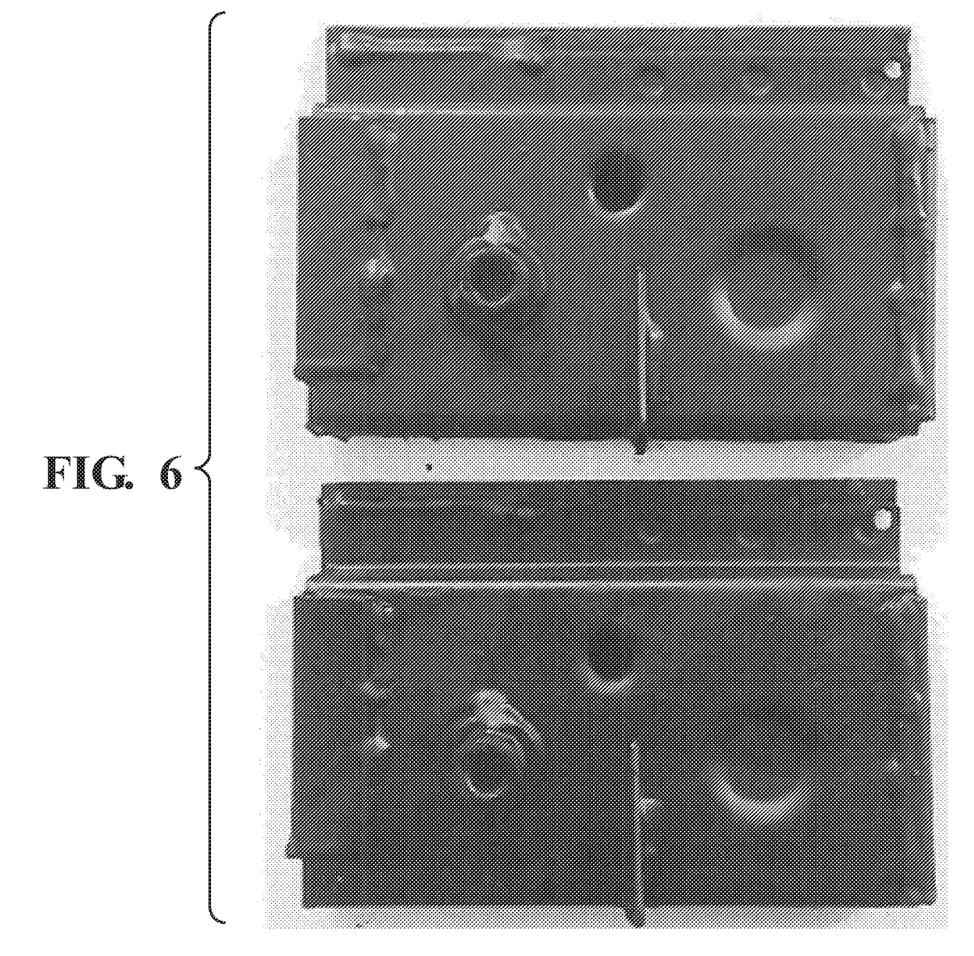

FIG. 6 shows steel box sections coated with the first layer 16 including phosphate (example referred to as "Enthone Phosphate") and the second layer 18 including 70% Mg NOX resistant high performance wax (example referred to as "NR 1290 HP at 70% Mg"). The corrosion performance of the box sections of FIG. 6 was measured, and the box sections had an average GMW 15357 rating of 10, on a scale from 1 to 10 with 10 being the best.

Figure 7:
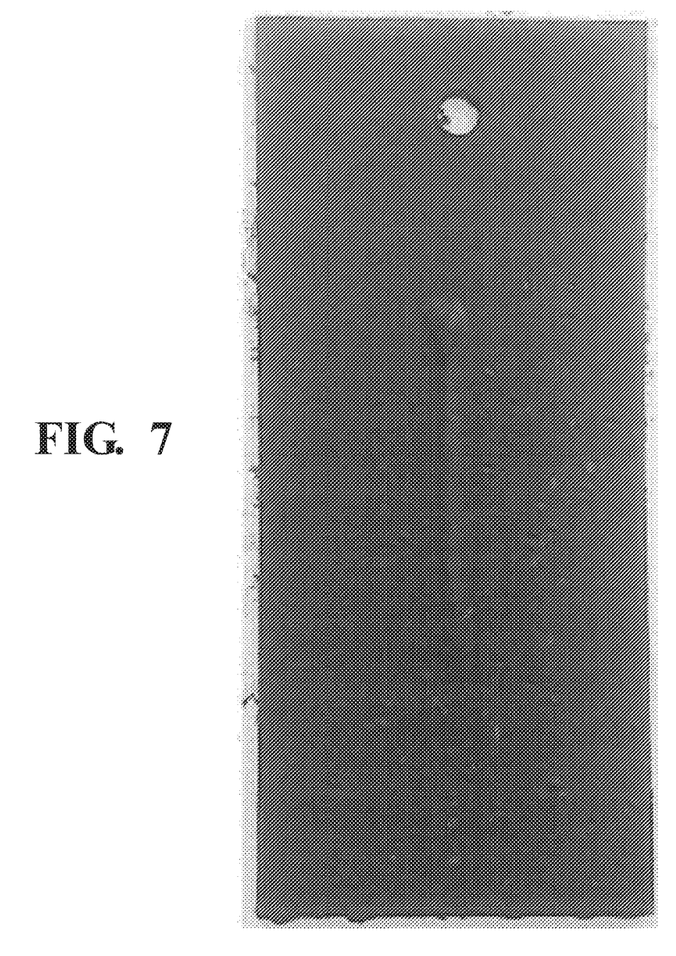
Figure 8:
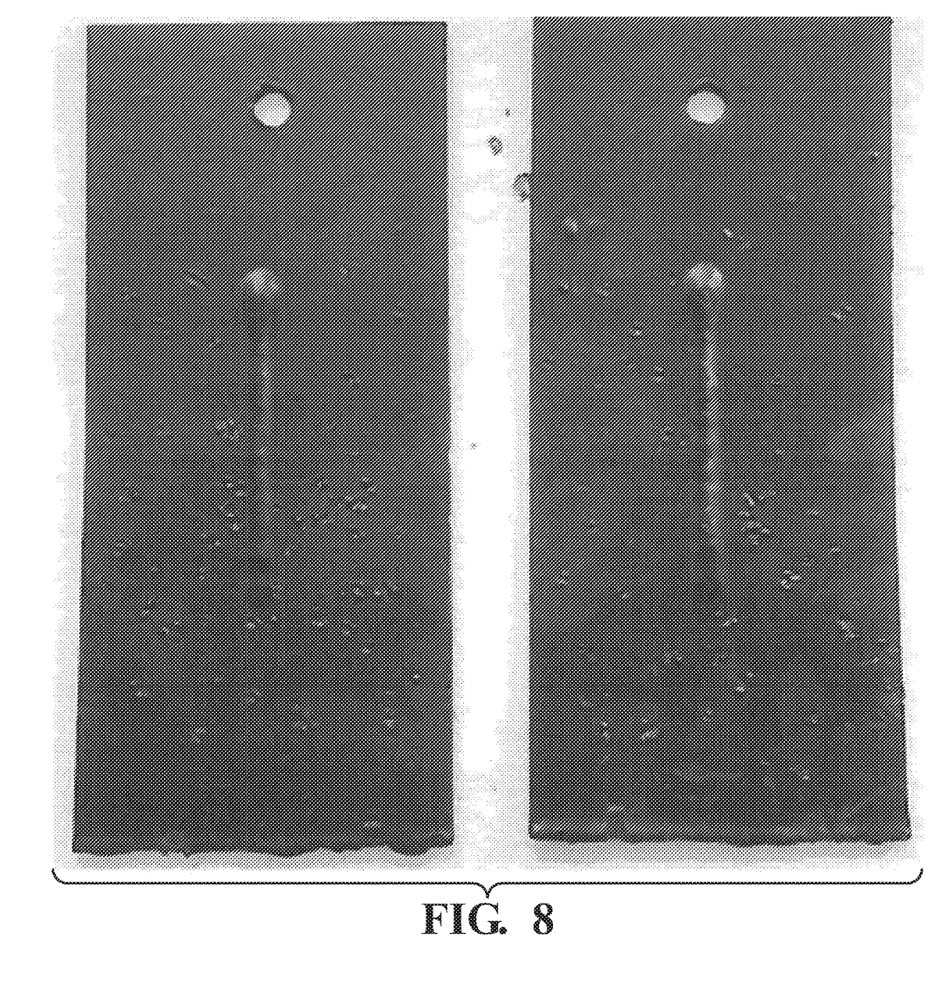
Figure 9:
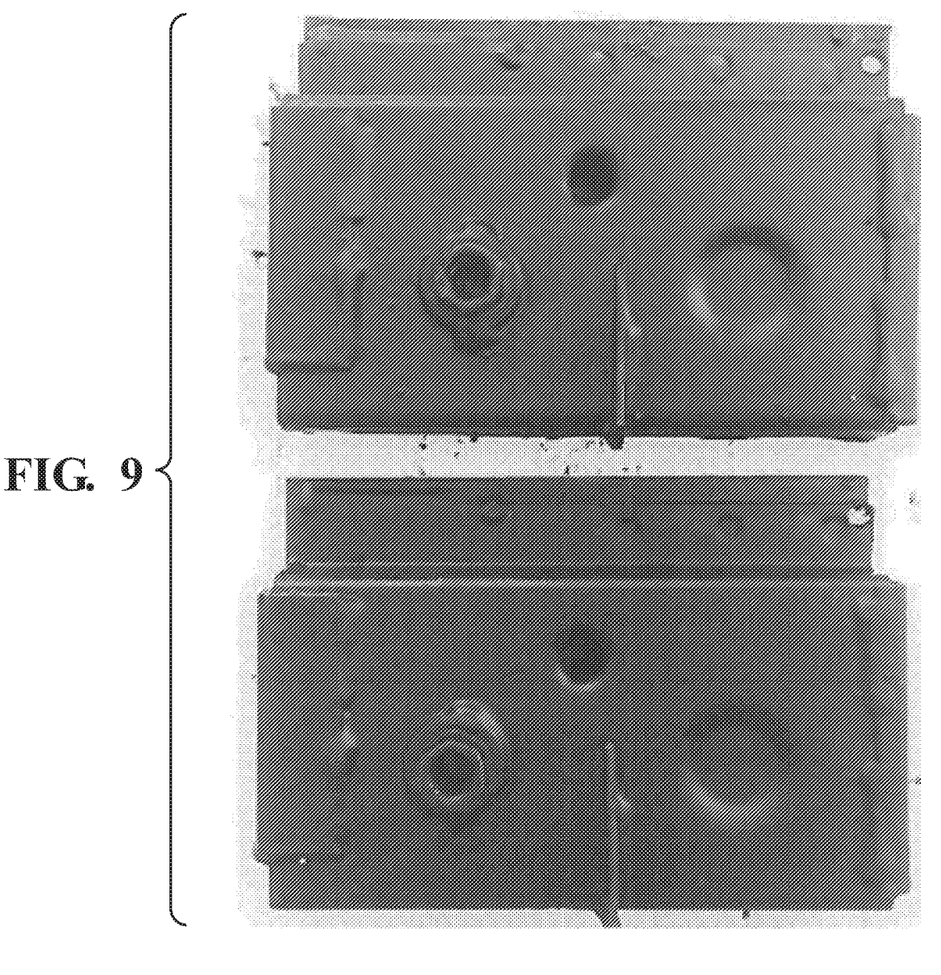

FIG. 7 shows a post heat treated steel panel coated with the first layer 16 including phosphate (example referred to as "PPG Phosphate") and the second layer 18 including standard NOX resistant high performance wax (example referred to as "NR 1290 HP Standard"). FIG. 8 shows steel panels coated with the first layer 16 including phosphate (example referred to as "PPG Phosphate") and the second layer 18 including 70% Mg NOX resistant high performance wax (example referred to as "NR 1290 HP at 70% Mg"). FIG. 9 shows a steel box section coated with the first layer 16 including phosphate (example referred to as "PPG Phosphate") and the second layer 18 including 70% Mg NOX resistant high performance wax (example referred to as "NR 1290 HP at 70% Mg"). The first layers 16 of FIGS. 7-9 is also referred to as Z24 heavy zinc phosphate. The corrosion performance of the panels of FIGS. 7 and 8 and the box sections of FIG. 9 was measured, and the panels and box sections had an average GMW 15357 rating of 10, on a scale from 1 to 10 with 10 being the best.

Figure 10:
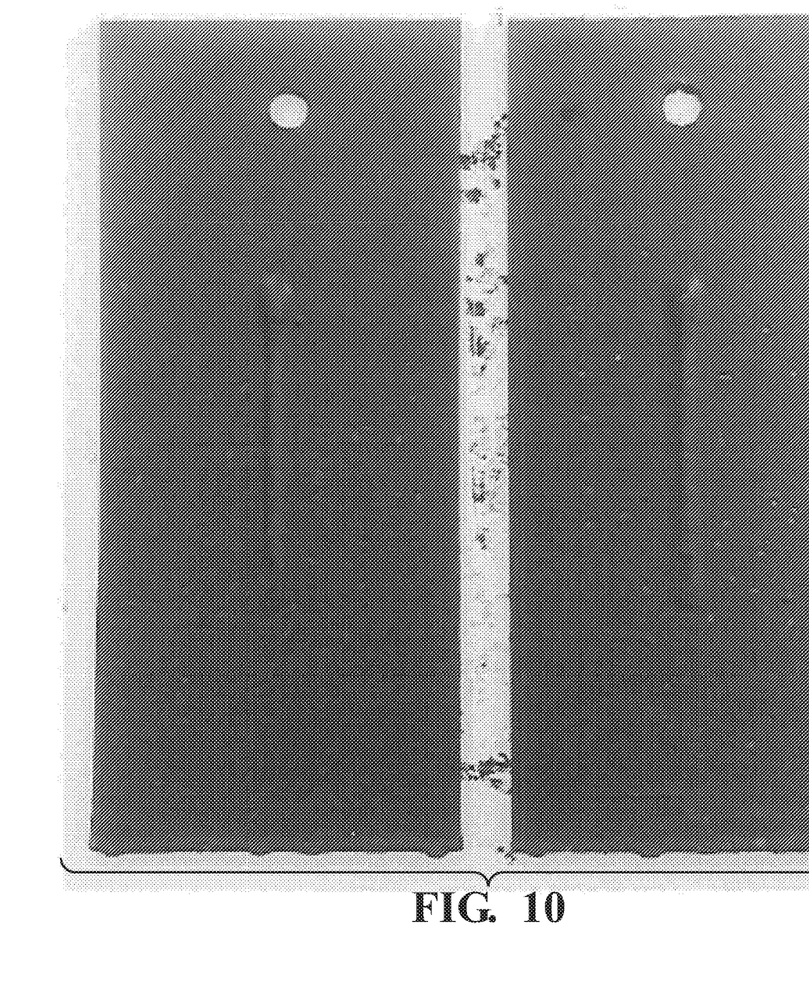

FIG. 10 shows post heat treated steel panels coated with the first layer 16 including phosphate (example referred to as "Henkel Phosphate") and the second layer 18 including a standard NOX resistant high performance wax (example referred to as "NR 1290 HP Standard"). The corrosion performance of the panels of FIG. 10 was measured, and the panels had an average GMW 15357 rating of 10, on a scale from 1 to 10 with 10 being the best.

Figure 11:
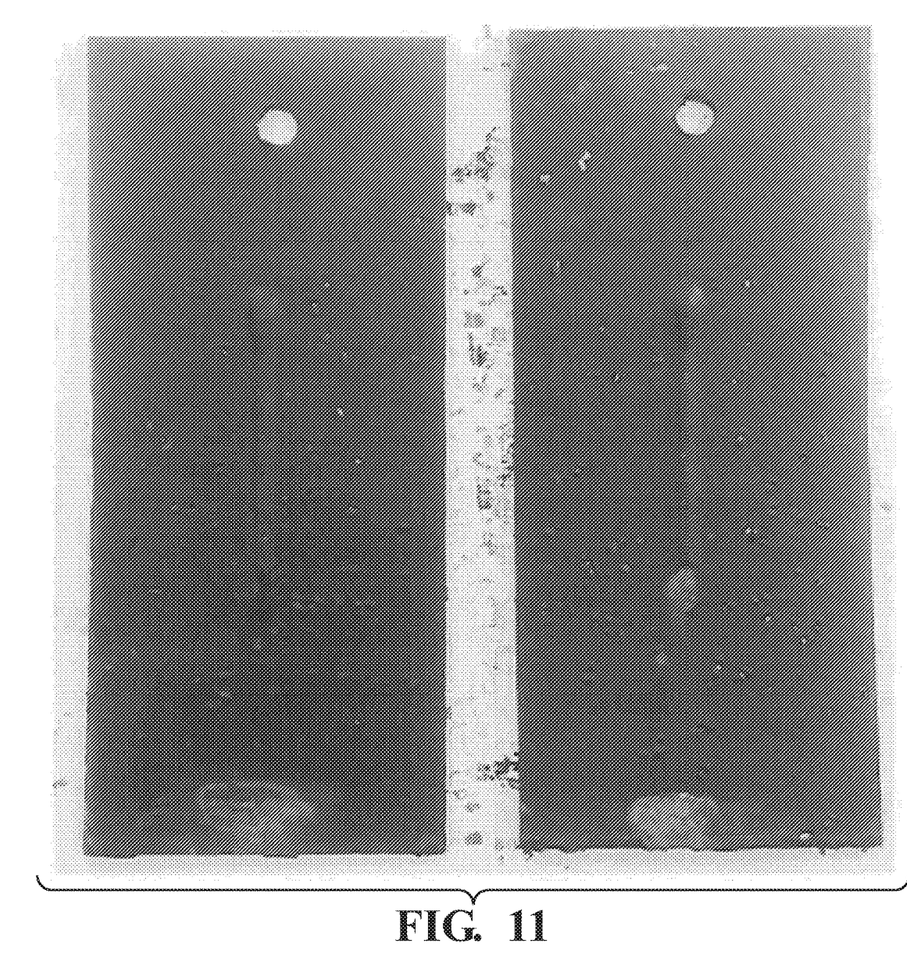
Figure 12:
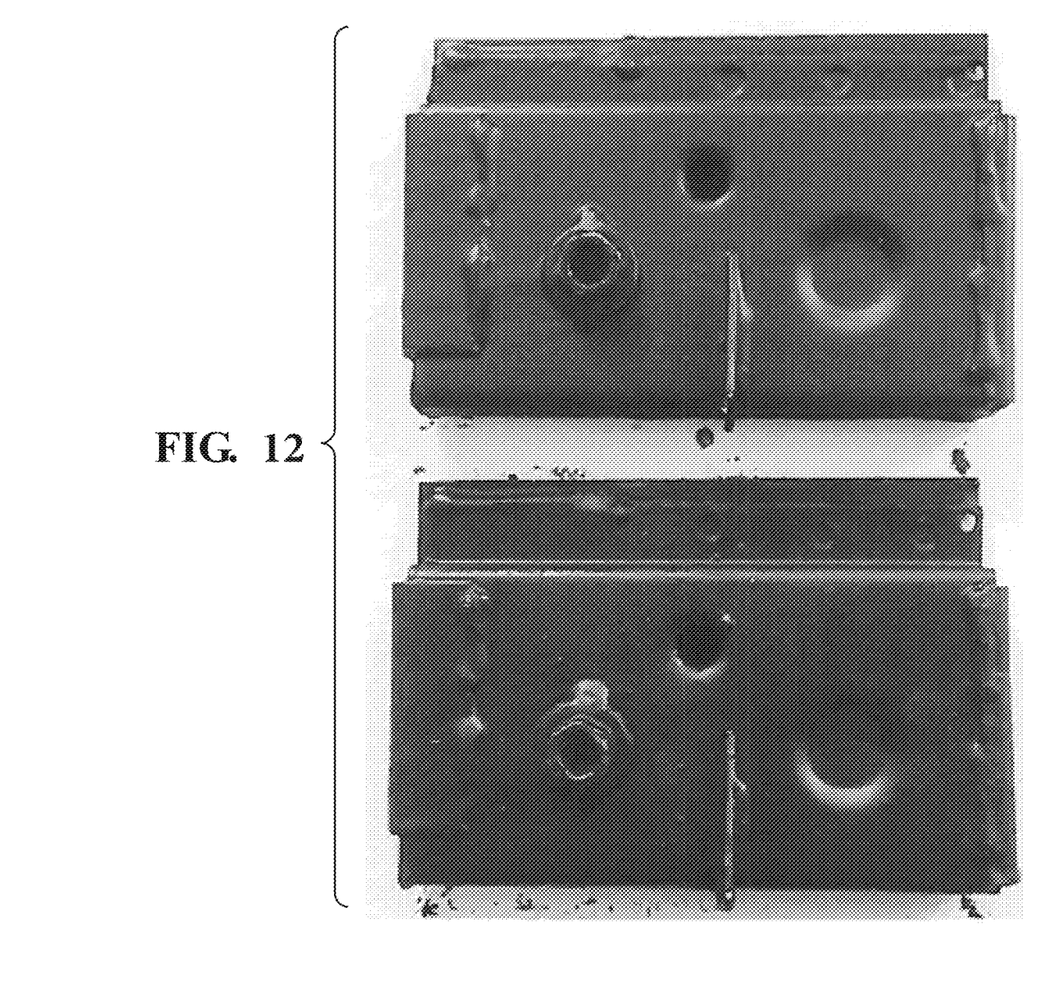

FIG. 11 shows steel panels coated with the first layer 16 including phosphate (example referred to as "Henkel Phosphate") and the second layer 18 including 70% Mg NOX resistant high performance wax (example referred to as "NR 1290 HP at 70% Mg"). FIG. 12 shows steel box sections coated with the first layer 16 including phosphate (example referred to as "PPG Phosphate") and the second layer 18 including 70% Mg NOX resistant high performance wax (example referred to as "NR 1290 HP at 70% Mg"). The first layer 16 of FIG. 12 is also referred to as Z24 heavy zinc phosphate. The corrosion performance of the panels and box sections of FIGS. 11 and 12 was measured, and the panels and box sections had an average GMW 15357 rating of 9, on a scale from 1 to 10 with 10 being the best.

Obviously, many modifications and variations of the present invention are possible in light of the above teachings and may be practiced otherwise than as specifically described while within the scope of the following claims.

What is claimed is:

1. A coating for a vehicle component, comprising:
   a first layer including phosphate, and a second layer including wax applied to the first layer, wherein the first layer has a weight of 900 mg/ft$^2$ to 2400 mg/ft$^2$.

2. A coating according to claim 1, wherein the first layer includes a first inorganic acid, an inorganic salt, a second inorganic acid, nickel salt, and ammonium bifluoride.

3. A coating according to claim 2, wherein the first layer includes the first inorganic acid in an amount of 10 to 20 wt. %, the inorganic salt in an amount of 10 to 20 wt. %, the second inorganic acid in an amount of 30 to 40 wt. %, the nickel salt in an amount of 1 to 10 wt. %, and the ammonium bifluoride in an amount of 0.1 to 1.0 wt. %, based on the total weight of the first layer.

4. A coating according to claim 2, wherein at least one of the inorganic acids and/or the inorganic salt include the phosphate.

5. A coating according to claim 1, wherein the first layer further includes zinc.

6. A coating for a vehicle component, comprising:
a first layer including phosphate, and a second layer including wax applied to the first layer, wherein the second layer has a thickness of 75 to 125 microns.

7. A coating according to claim 1, wherein the second layer includes petroleum, carbon black pigment, and a corrosion inhibitor, the corrosion inhibitor including magnesium.

8. A coating for a vehicle component, comprising:
a first layer including phosphate, and
a second layer applied to the first layer,
the second layer including wax and a corrosion inhibitor,
wherein the second layer includes the corrosion inhibitor in an amount of 55 to 70 wt. %, based on the total weight of the second layer.

9. A method of manufacturing a coating for a vehicle component, the method comprising the step of:
applying a second layer including wax and a corrosion inhibitor to a first layer including phosphate, the second layer including the corrosion inhibitor in an amount of 55 to 70 wt. %, based on the total weight of the second layer.

10. A vehicle component, comprising: a substrate and a coating according to claim 1 applied to the substrate.

11. A vehicle component according to claim 10, wherein the substrate is formed of steel.

12. A vehicle component according to claim 10, wherein the component is a frame or cradle assembly.

13. A vehicle component according to claim 10, wherein the coating covers at least one weld and/or heat affected zone of the substrate.

14. A vehicle component according to claim 10, wherein the first layer of the coating includes a first inorganic acid, an inorganic salt, a second inorganic acid, nickel salt, and ammonium bifluoride; and the second layer of the coating includes petroleum, carbon black pigment, and a corrosion inhibitor, the corrosion inhibitor including magnesium.

15. A method of manufacturing a vehicle component, comprising the steps of:
applying a first layer including phosphate to a substrate, and applying a second layer including wax and a corrosion inhibitor to the first layer, wherein the second layer includes the corrosion inhibitor in an amount of 55 to 70 wt. %, based on the total weight of the second layer.

16. A method of manufacturing a coating according to claim 9, wherein the first layer includes a first inorganic acid in an amount of 10 to 20 wt. %, an inorganic salt in an amount of 10 to 20 wt. %, a second inorganic acid in an amount of 30 to 40 wt. %, a nickel salt in an amount of 1 to 10 wt. %, and ammonium bifluoride in an amount of 0.1 to 1.0 wt. %, based on the total weight of the first layer.

17. A method of manufacturing a coating according to claim 9, wherein the second layer includes petroleum in an amount of 10 to 25 wt. %, and carbon black pigment in an amount of 5 to 10 wt. %, based on the total weight of the second layer.

18. A method of manufacturing a coating according to claim 9, wherein the first layer includes a first inorganic acid, an inorganic salt, a second inorganic acid, nickel salt, and ammonium bifluoride; and the second layer includes petroleum, carbon black pigment, and the corrosion inhibitor including magnesium.

19. A method of manufacturing a vehicle component according to claim 15, wherein the first layer includes a first inorganic acid in an amount of 10 to 20 wt. %, an inorganic salt in an amount of 10 to 20 wt. %, a second inorganic acid in an amount of 30 to 40 wt. %, nickel salt in an amount of 1 to 10 wt. %, and ammonium bifluoride in an amount of 0.1 to 1.0 wt. %, based on the total weight of the first layer.

20. A method of manufacturing a vehicle component according to claim 15, wherein the second layer includes petroleum in an amount of 10 to 25 wt. %, and carbon black pigment in an amount of 5 to 10 wt. %, based on the total weight of the second layer.

* * * * *